(12) United States Patent  (10) Patent No.: US 8,772,435 B2
Simpson et al.  (45) Date of Patent: Jul. 8, 2014

(54) DISPERSANTS

(75) Inventors: Neil L. Simpson, Oldham (GB); Dean Thetford, Norden (GB)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 1034 days.

(21) Appl. No.: 11/911,039

(22) PCT Filed: Apr. 7, 2006

(86) PCT No.: PCT/US2006/013604
§ 371 (c)(1),
(2), (4) Date: Oct. 9, 2007

(87) PCT Pub. No.: WO2006/113258
PCT Pub. Date: Oct. 26, 2006

(65) Prior Publication Data
US 2008/0163790 A1 Jul. 10, 2008

Related U.S. Application Data

(60) Provisional application No. 60/671,010, filed on Apr. 13, 2005.

(51) Int. Cl.
*C08G 63/06* (2006.01)
(52) U.S. Cl.
USPC ............................ 528/271; 528/323; 528/324
(58) Field of Classification Search
CPC ..................................................... C08G 69/08
See application file for complete search history.

(56) References Cited

U.S. PATENT DOCUMENTS 5,488,095 A * 1/1996 Boeckh et al. ................ 510/479

FOREIGN PATENT DOCUMENTS

| EP | 0164817 A2 | 12/1985 |
| EP | 0189385 A2 | 7/1986 |
| EP | 0322154 A2 | 6/1989 |
| EP | 0768321 A2 | 4/1997 |
| GB | 1305715 | 2/1973 |
| JP | 5156008 A | 6/1993 |
| JP | 2001240780 A | 9/2001 |
| WO | 81/02395 A1 | 9/1981 |
| WO | 96/14344 A1 | 5/1996 |
| WO | 98/19784 A1 | 5/1998 |
| WO | 99/55763 A1 | 11/1999 |
| WO | 01/21298 A1 | 3/2001 |

OTHER PUBLICATIONS

Communication pursuant to Article 94(3) EPC dated Feb. 28, 2011 from European Patent Office pp. 1-6.

* cited by examiner

*Primary Examiner* — Paul A Zucker
(74) *Attorney, Agent, or Firm* — Samuel B. Laferty

(57) ABSTRACT

The present invention relates to dispersants for dispersing a particulate solid for millbases, paints and inks. The present invention provides a composition containing a particulate solid, a polar organic medium and a compound or salts thereof for formula $T-(A)_m(B)_n-X-Z-Q_{(o-p)}$ wherein T is hydrogen or a polymerization terminating group; A is the residue of a hydroxy carboxylic acid or lactone thereof; B is the residue of an amino carboxylic acid; X is a direct bond or a divalent group; Z is an acidic or basic group or a moiety which contains an acidic or basic group; Q is an optional residue of an oxide, urea or a dibasic acid or anhydride thereof; m and n are positive integers; and p represents the number of residual amino and/or imino groups in Z.

20 Claims, No Drawings

DISPERSANTS

CROSS REFERENCE TO RELATED APPLICATION

This application claims priority from PCT Application Serial No. PCT/US2006/013604 filed on Apr. 7, 2006, which claims the benefit of U.S. Provisional Application No. 60/671,010 filed on Apr. 13, 2005.

FIELD OF INVENTION

The present invention relates to dispersants for dispersing a particulate solid such as a pigment or filler in a polar medium and to millbases, paints and inks.

BACKGROUND OF INVENTION

There are numerous publications in the patent literature which describe dispersants, which are either phosphate esters of polyester chains containing a terminating hydroxy group, or which are polyester amines obtained by reacting a polyester chain having a terminating carboxylic acid group with a polyamine or polyimine, such as polyethyleneimine. For example, WO 94/21368 discloses a dispersant comprising a polyethyleneimine residue carrying polyester chains derived from a caprolactone and at least one other specified lactone or hydroxycarboxylic acid; WO 99/55763 discloses a similar amine dispersant where the polyester chain is derived from two or more different linear hydroxycarboxylic acids or lactones thereof and a residue of an ethylenically unsaturated group; and WO 98/19784 discloses a dispersant of the formula $T-(A)_n-(B)_p-Z$ where A and B are each independently oxyalkylene carbonyl groups derivable from various lactones and Z is an acidic or basic group such as polyethyleneimine or phosphate. While such dispersants may be tailored for use in polar or non-polar liquid media, it has now been found that a further improved performance in polar liquid media may be obtained by replacing the polyester chain with a polyester/polyamide chain.

DISCLOSURE OF THE INVENTION

According to the first aspect of the invention, there is provided a dispersant of formula 1:

$$T-(A)_m(B)_n-X-Z-Q_{(0-p)} \quad \text{Formula (1)}$$

including salts thereof
wherein
T is hydrogen or a polymerisation terminating group;
A is the residue of a hydroxy carboxylic acid or lactone thereof;
B is the residue of an amino carboxylic acid;
X is a direct bond or a divalent group;
Z is an acidic or basic group or a moiety which contains an acidic or basic group;
Q is a residue of an oxide, urea or a dibasic acid or anhydride thereof which is attached to the basic group or moiety which contains a basic group represented by Z;
m and n are positive integers (desirably non-zero);
m+n is from 4 to 2000;
the symbol (0-p) means from the value 0 to the value of p; and
p represents the maximum available number of amino and/or imino groups in Z which does not carry the group $T-(A)_m(B)_n-X-$.

When Z is polyvalent, there may be more than one group $T-(A)_m-(B)_n-X-$ attached to Z, and such groups may be the same or different. It is also to be understood that either A or B may be attached to T.

When T is a polymerisation terminating group, it is preferably the residue of a carboxylic acid R—COOH or an alcohol R—OH where R is $C_{1-50}$-hydrocarbyl, which is optionally substituted.

Preferably, R contains not greater than 40, more preferably, not greater than 30, and especially not greater than 20 carbon atoms.

R may be aryl, aralkyl, heteroaryl, cycloalkyl and especially alk(en)yl which may be linear or branched. It is much preferred that R is alkyl.

When R is aryl, it is preferably phenyl or naphthyl which is optionally substituted by $C_{1-20}$-alkyl, $C_{1-20}$-alkoxy, halogen, nitrile or phenoxy. Specific examples of R—OH are phenol, 2-naphthol, 4-octylphenol and 4-nonylphenol. Specific examples of R—COOH are benzoic acid and naphthalene-2-carboxylic acid.

When R is aralkyl, it is preferably benzyl alcohol, 2-hydroxyethylphenyl or 2-carboxyethyl phenyl.

When R is hetero-aryl, it is preferably thienyl.

When R is cycloalkyl, it is preferably $C_{3-8}$-cycloalkyl, such as cyclopropyl and especially cyclohexyl, which is optionally substituted by one or more $C_{1-6}$-alkyl groups.

As noted hereinbefore, it is particularly preferred that R is optionally substituted alkyl, especially alkyl containing one or more ether groups. Specific examples of R—COOH are methoxyacetic acid, propionic acid, butyric acid, hexanoic acid, octanoic acid, lauric acid, dodecanoic acid, stearic acid, 2-ethylbutyric acid, 2-ethylhexanoic acid, 2-butyloctanoic acid, 2-hexyldecanoic acid, 2-octyldodecanoic acid and 2-decyltetradecanoic acid. Branched alkyl carboxylic acids of this type are available under the trademark Isocarb (ex Condea GmbH) and specific examples are Isocarb 12, 16, 20, 28, 32, 34T and 36. Many of the carboxylic acids are available commercially as mixtures.

When R is substituted, it preferably contains one or more ether groups in R—COOH, and especially at least two ether groups. The ether groups may constitute a poly $C_{1-4}$-alkyleneoxide chain containing propoxy, ethoxy or butoxy groups including mixtures thereof. Preferred mixtures are propoxy/ethoxy polyether chains. Where the polyether chain contains more than one different alkylene oxide unit, it is preferred that the amount of ethylene oxide is not less than 50%, more preferably not less than 70%, and especially not less than 90% by weight of the polyether chains. It is much preferred, however, that the polyether chain is composed entirely of ethylene oxide units.

When R—COOH contains a polyether chain, it is preferably a polyalkyleneoxy mono $C_{1-24}$-alkyl ether. The weight average molecular weight of the polyethyleneoxy mono alkyl ether is preferably not greater than 2000, more preferably not greater than 1000, and especially not greater than 600. Mono alkyl ether carboxylic acids of formula $R^1$—O—$(CH_2CH_2)_q$—$CH_2$—COOH are available under the trade name Akypo™ of Kao Chemicals GmbH. Specific examples are Akypo™ LF1 ($R^1$ is $C_8$, q=5), Akypo™ LF2 ($R^1$ is $C_8$, q=8), Akypo™ RLM 25 ($R^1$ is $C_{12}/C_{14}$, q=2.5), Akypo™ RLM 45 CA ($R^1$ is $C_{12}/C_{14}$, n=4.5), Akypo™ RO 20 VG ($R^1$ is $C_{16}/C_{18}$, n=2) and Akypo™ RO 50 VG ($R^1$ is $C_{16}/C_{1-8}$, n=5).

Examples of R—OH are methanol, ethanol, n-butanol, n-hexanol, n-octanol, n-decanol, n-dodecanol, n-tetradecanol, n-hexadecanol, n-octadecanol, oleyl alcohol, isopropanol, isobutanol, tertbutanol, 2-ethylbutanol, 3-heptanol, 2-ethylhexanol, 3,5,5-trimethylhexanol, 3,7-dimethyloctanol and the so-called Guerbet alcohols, such as those which are commercially available under the trade name Isofol (ex Condea GmbH) including mixtures thereof. Specific examples of Guerbet alcohols are Isofol 12, 14T, 16, 18T, 18E, 20, 24, 28, 32, 32T and 36.

When R in R—OH is substituted alkyl, it preferably contains one or more ether groups, and especially not less than two ether groups. The ether groups may constitute a poly $C_{1-4}$-alkylene oxy chain containing propoxy, ethylene oxy or butylene oxy repeat units including mixtures thereof. Where the polyether chain contains more than one different alkylene oxy repeat unit, it is preferred that not less than 50%, more preferably not less than 70%, and especially not less than 90% by weight of the polyether chain is composed of ethylene oxy units. It is especially preferred that the polyether chain contains solely ethylene-oxy units. Preferred alcohols of this type are polyethylene oxy mono $C_{1-24}$-alkyl ethers, preferably the $C_{1-12}$-mono alkyl ethers, and especially $C_{1-6}$-mono alkyl ethers. Because of their ready availability, the monomethyl ethers are much preferred. The weight average molecular weight of the polyalkylene oxy mono alkyl ether is preferably not greater than 2000, and especially not greater than 1000. Specific examples of polyethylene oxy mono methyl ethers have weight average molecular weights of 350, 550 and 750. Other examples of polyether mono alkyl ethers are Guerbet alcohols which are reacted with ethylene oxide, especially those having a weight average molecular weight from 250 to 750.

The hydroxy carboxylic acid from which A is derived in one embodiment from a hydroxy-$C_{2-20}$-alkenylene carboxylic acid, and especially a hydroxy-$C_{1-20}$-alkylene carboxylic acid. The alk(en)ylene group (where (en) indicates alternatively the alkylene or alkenylene) may be linear or branched. Examples of hydroxy carboxylic acids are ricinoleic acid, 12-hydroxy stearic acid, 6-hydroxy caproic acid, 5-hydroxy valeric acid, 12-hydroxy dodecanoic acid, 5-hydroxy dodecanoic acid, 5-hydroxy decanoic acid, 4-hydroxy decanoic acid, 10-hydroxy undedanoic acid, lactic acid and glycolic acid.

As noted hereinbefore, A may be derived from a lactone. Examples of suitable lactones are β-propiolactone, optional alkyl substituted s-caprolactone and optionally alkyl substituted δ-valerolactone. The alkyl substituent in s-caprolactone and δ-valerolactone is preferably $C_{1-6}$-alkyl, and especially $C_{1-4}$-alkyl, and may be linear or branched. Examples of suitable lactones are ϵ-caprolactone and the 7-methyl-, 3-methyl-, 5-methyl-, 6-methyl-, 4-methyl-, 5-tertbutyl-, 4,4,6-trimethyl- and 4,6,6-trimethyl-analogues thereof.

Mixtures of hydroxy carboxylic acids and/or lactones may be used.

When A is derived from optionally substituted ϵ-caprolactone and one or more other lactone the ϵ-caprolactone is preferably present in not less than 50%, more preferably not less than 70%, and especially not less than 90% by weight of the total amount of lactone. It is much preferred that A is derived from ϵ-caprolactone itself.

The amino carboxylic acid from which B is derived is preferably amino-$C_{2-20}$-alkenylene carboxylic acid, and especially amino-$C_{1-20}$-alkylene carboxylic acid. The alk(en)ylene group may be linear or branched. Preferably, the alk(en)ylene group of the amino carboxylic acid contains not greater than 12 carbon atoms. Specific examples are 11-amino undecanoic acid, and especially 6-amino caproic acid, 4-aminobutyric acid, β-alanine and sarcosine. Mixtures of amino carboxylic acids may be used.

When X is a divalent bond, it is preferably the residue of an ethylenically unsaturated group when Z is a basic group or a moiety containing a basic group. Preferred residues containing an ethylenically unsaturated group contain a hydroxy group and are preferably derived from (meth)acrylic acid. Examples of compounds which contain an ethylenically unsaturated group and a hydroxy group are hydroxyethyl (meth)acrylate, hydroxy propyl(meth)acrylate, hydroxybutyl (meth)acrylate, polyethylene mono(meth)acrylate, polypropylene glycol mono(meth)acrylate, polyethylene glycol polytetramethylene glycol mono(meth)acrylate and polypropylene glycol polytetramethylene glycol mono(meth)acrylate (e.g., Blemmer™ PE, Blemmer™ PP from Nihon Yushi Co. Ltd). Preferably, the ethylenically unsaturated group is derivable from hydroxyethyl(meth)acrylate.

When Z is an acidic group or a moiety which contains an acidic group, the acidic group is preferably a sulphonate, sulphate, phosphonate or phosphate, including pyrophosphate. In one preferred embodiment, Z is an ortho-phosphate group.

When Z is a basic group or a moiety which contains a basic group, the basic group is preferably an amine, polyamine or polyimine. Examples of suitable amines are ethylenediamine, diethylene triamine, triethylene tetramine, tetraethylene pentamine, penta ethylene hexamine, N,N'-dimethylethylenediamine, piperazine, 2-methylpiperazine, 2,5-dimethyl-piperazine, 1,4-bis(3-aminopropyl)piperazine, N-aminoethylpiperazine, isophoronediamine, polyoxypropylethylenediamine, polyoxyethylenediamine, bis(4-amino-3-methyldicyclohexyl)methane, diaminodicyclohexylmethane, bis(aminomethyl)cyclohexane, m-xylylenediamine, α-(m-aminophenyl)-ethylamine, α-(p-aminophenyl)ethylamine, m-phenylenediamine, diaminodiphenylmethane, diaminodiphenylsulphone and norbornanediamine.

Z may also be the residue of a substituted aliphatic tertiary amine such as 3-dimethylaminopropylamine and N,N-dimethylethanolamine.

Examples of polyamines are polyvinylamine and polyallylamine.

The polyimine is preferably poly($C_{2-6}$-alkyleneimine) and especially polyethylene imine (hereinafter PEI). The polyimine may be linear or preferably branched. Linear polyethyleneimines can be prepared by hydrolysis of poly (N-acyl) alkyleneimines as described, for example, by Takeo Saegusa et al in Macromolecules, 1972, Vol. 5, page 4470. The branched polyethyleneimines of differing molecular weights are commercially available from BASF and Nihon Shokubai. Polyallylamine and poly-(N-alkyl) allylamines of differing molecular weights are commercially available from Nitto Boseki. Polyvinylamine of differing molecular weights are available from Mitsubishi Kasai. Poly(propyleneimine) dendrimers are commercially available from DSM Fine Chemicals and poly(amidoamine) dendrimers are available as "Starburst" dendrimers from Aldrich Chemical Co.

When Z is a basic group or a moiety containing a basic group, it is preferably the residue of polyallylamine, polyvinylamine and especially polyalkyleneimine such as PEI.

The number average molecular weight of the polyamine or polyimine is preferably from 500 to 600,000, more preferably from 1,000 to 200,000, even more preferably from 1,000 to 100,000, and especially from 1200 to 100,000.

When Q is the residue of a dibasic acid or anhydride thereof, the dibasic acid or anhydride may be aromatic or aliphatic optionally substituted by $C_{1-6}$-alkyl or halogen. Preferably, it has a weight-average molecular weight below 500. Examples of suitable dibasic acids or anhydrides are succinic anhydride, maleic anhydride, malic anhydride, phthalic anhydride, glutaric anhydride, hexahydrophthalic anhydride, succinic acid and teraphthalic acid.

Preferably m+n is not greater than 1000, more preferably not greater than 100, even more preferably not greater than 50, and especially not greater than 20.

When Z is a polyamine or polyimine, any free imino or amino groups may be reacted with oxygen or peroxide, urea or a dibasic acid or anhydride. Where Q is the residue of urea, the number of free imino or amino groups in Z when reacted with urea can vary over wide limits up to the maximum available nitrogen atoms which do not carry a group T-$(A)_m$$(B)_n$—X—. Similarly, when Q is the residue of a dibasic acid or anhydride, the number of free amino or imino groups in Z which are reacted with the dibasic acid or anhydride can also vary over wide limits that in this instance it is much preferred that the majority of nitrogen atoms in Z which no not carry the group T-$(A)_m$$(B)_n$—X— are reacted with the dibasic acid or anhydride.

When Q is the residue of an oxide, any of the amino or imino groups in Z which do not carry the group T-$(A)_m$$(B)_n$—X— may be converted to a N-oxide by reaction with oxygen (including air) or a peroxide such as hydrogen peroxide or ammonium persulphate.

When T is the residue of an acid R—COOH and X is a direct bond, the dispersant is preferably derivable from an acid of formula 2:

$$R—CO(A)_m(B)_n—OH \quad \text{Formula (2)}$$

This is, hereinafter, referred to as a TPOAC acid.

When T is the residue of an alcohol T-OH and X is a direct bond, the dispersant is preferably derivable from an alcohol of formula 3:

$$RO(A)_m(B)_n—H \quad \text{Formula (3)}$$

This is hereinafter referred to as a TPOAC alcohol.

According to a first aspect of the invention, the dispersant comprises a polyvinylamine, polyallylamine, or especially a poly($C_{2-4}$-alkyleneimine) (hereinafter PAI) carrying at least two chains of formula 4:

$$T-(A)_m(B)_n— \quad \text{Formula (4)}$$

wherein T, A, B, m and n are as defined hereinbefore.

Each of the chains represented by formula 4 may be linked to the polyallylamine, polyvinylamine or PAI through either a covalent amide link —CON< formed between a terminating carbonyl group of the TPOAC acid and a primary or secondary nitrogen atom in the polyvinylamine, polyallylamine or PAI or through an ionic linkage —COO$^-$HN$^+$=formed between a terminating —COOH group of the TPOAC acid and a positively charged nitrogen atom of a substituted ammonium group in the polyallylamine, polyvinylamine or PAI. Because the dispersant contains two or more chains T-$(A)_m(B)_n$—, it may contain a mixture of amide and salt linkages depending on the reaction conditions used in its preparation.

The dispersant of the first aspect of the invention may be conveniently represented by formula 5:

Formula (5)

wherein

X-*-*-X represents polyvinylamine, polyallylamine or PAI;

Y represents the chain T-$(A)_m(B)_n$— which is linked via an amide and/or salt linkage;

r is from 4 to 2000; and

T, A, B, m and n are as defined hereinbefore.

The chains represented by Y may be the same or different.

Preferably r is not less than 10. It is also preferred that r is not greater than 1000 and especially not greater than 500.

It is also preferred that the weight ratio of Y to X-*-*-X is from 30:1 to 1:1, more preferably from 20:1 and 5:1, and especially from 17:1 to 7:1.

The PAI is preferably polyethyleneimine (PEI) which may be linear or preferably branched.

The PAI preferably has a number-average molecular weight from 500 to 600,000, more preferably from 1,000 to 200,000, even more preferably from 1,000 to 100,000, and especially from 1,200 to 50,000.

Preferably, A is the residue of ε-caprolactone and B is the residue of 6-amino caproic acid, 4-amino butyric acid, β-alanine or sarcosine.

Particularly useful dispersants of the first aspect of the invention have a ratio of m:n from 3:1 to 1:3 and where m+n is not greater than 20.

As a further variant on the dispersants of formula 5, there is provided a dispersant of formula 6:

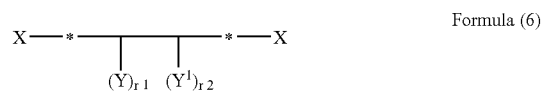

Formula (6)

wherein

X-*-*-X and Y are as defined hereinbefore; and $Y^1$ represents a chain T-$(A)_m$-X— wherein T, A, X, and m are as defined hereinbefore. $r^2$ is a positive non-zero integer.

The polyester chain represented by A in $Y^1$ may be derived from more than one different hydroxy carboxylic acid or lactone thereof. It is particularly preferred that T-$(A)_m$-X— is derived from optionally alkyl substituted ε-caprolactone substituted δ-valerolactone, 12-hydroxystearic acid, or ricinoleic acid and mixtures thereof.

The dispersants of the first aspect of the invention are preferably made by reacting a preformed TPOAC acid with polyallylamine, polyvinylamine or PAI at a temperature from 100° C. to 150° C., preferably in an inert atmosphere.

The TPOAC acid is preferably prepared by reacting at least one hydroxycarboxylic acid or lactone thereof, with at least one amino carboxylic acid at a temperature from 50° C. to 250° C., optionally in the presence of a carboxylic acid R—COOH, and optionally in the presence of an esterification catalyst. It is preferred that the temperature is not less than 100° C. and especially not less than 150° C. In order to minimise any charring of the final product, it is preferred that the temperature is not greater than 200° C. The inert atmosphere may be provided by any inert gas of the Periodic Table but is preferably nitrogen.

The esterification catalyst may be any previously known to the art and include tetra-alkyl titanate, for example, tetrabutyltitanate, zinc salt of an organic acid, for example, zinc acetate, zirconium salt of an aliphatic alcohol, for example, zirconium isopropoxide, toluene sulphonic acid or a strong organic acid such as trifluoroacetic acid.

In another preferred aspect of the invention, there is provided a dispersant of formulae 5 and 6 wherein Y represents a chain residue of formula 7:

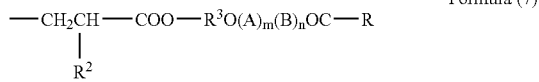

wherein
A, B, R, m and n are as defined hereinbefore; and
$R^2$ is hydrogen or $C_{1-4}$-alkyl; and
$R^3$ is an aliphatic or aromatic residue containing up to 10 carbon atoms which optionally contains a polyether residue derivable from propylene oxide and/or ethylene oxide.

When $R^1$ is $C_{1-4}$-alkyl it is preferably methyl.

$R^3$ is preferably $C_{2-6}$-alkylene and especially $C_{2-4}$-alkylene.

The dispersants containing the chain residue of formula 7 may be conveniently prepared by the Michael addition reaction of an amine, polyamine or polyimine to a compound of formula 8:

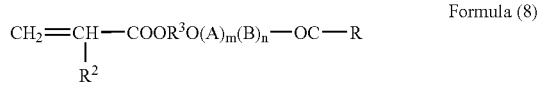

wherein A, B, R, $R^2$, $R^3$, m and n are as defined hereinbefore.

The compound of formula 8 can be conveniently prepared by reacting an (alk)acrylic acid derivative containing a hydroxy group with a preformed TPOAC acid of formula 2 at a temperature from 50° C. to 150° C., preferably from 80° C. to 120° C., in the presence of air or oxygen. Preferably, the reaction is carried out in the presence of an esterification catalyst such as a tetra-alkyl titanate, for example, tetra butyl titanate, a metal alkoxide such as tetraisopropyltitanate, a tin catalyst such as stannous chloride, stannous octylate or monobutyl tin oxide or an acid catalyst such as toluene sulphonic acid or trifluoroacetic acid. The reaction is also preferably carried out in the presence of a polymerisation inhibitor to inhibit the self-polymerisation of the compound of formula 8 or the (alk)acrylic acid derivative. Examples of polymerisation inhibitors are (methyl)hydroquinone and phenothiazine. Oxygen also acts as a polymerisation inhibitor.

The reaction between the amine, polyamine or polyimine and the compound of formula 8 is preferably carried out by heating between 110° C. and 130° C., especially between 20° C. and 100° C. Stoichiometric amounts of the amine and compound of formula 8 may be used, but it is preferred to react the compound of formula 8 with a polyamine or polyimine, especially PEI.

The reaction between the compound of formula 8 and an amine, polyamine or polyimine may optionally be carried out in the presence of a solvent which is inert to the reactants. Examples of suitable solvents are hydrocarbons such as toluene, xylene and solvesso, ketones such as acetone, methylethylketone and methylisobutylketone, alkanols such as n-butanol and isopropanol and esters such as butyl acetate, dimethyladipate, dimethyl succinate and dimethyl glutarate.

When the dispersant of the first aspect of the invention contains free amino or imino groups, these may be converted into a salt by reaction with an organic or preferably inorganic acid such as acetic acid, sulphuric acid, hydrochloric acid, alkyl sulphonic acids, alkyl hydrogen sulphates and aryl sulphonic acids, including the salt of anionic dyestuffs. The free amino or imino groups may also be converted to quaternary ammonium salt by reacting with a dialkyl sulphate such as dimethyl sulphate, an alkyl halide such as ethyl bromide or a benzyl halide such as benzylchloride.

As disclosed hereinbefore, the free amino and/or imino groups in the dispersant may also be reacted with oxygen (air), urea or a dibasic acid or anhydride thereof.

Mixtures of dispersants in the quaternary ammonium form and in the form of the reaction product with oxygen, urea and dibasic acid or anhydride may also be used.

According to a second aspect of the invention, there is provided a dispersant which is a phosphate ester of a TPOAC alcohol of formula 3. The phosphate ester may be an ester of ortho- or pyro-phosphoric acid, including mixtures thereof.

In a preferred embodiment of the second aspect of the invention, the dispersant may be a compound of formula 9:

wherein R, A, B, m and n are as defined hereinbefore;
L is sulphate, pyrophosphate or especially orthophosphate;
m is a cation; and
w is 1 or 2 including mixtures thereof.

R is preferably optionally substituted alkyl in the dispersants of formula 9.

Where R is substituted, the substituent is preferably one or more ether groups and RO— is especially the residue of a polyalkylene ether mono alkyl ether and specifically a polyethylene glycol mono alkyl ether.

The dispersants of formula 9 may be conveniently made by reacting a TPOAC alcohol of formula 3 with a sulphating or phosphating agent. The reaction may be carried out in an inert solvent, but it is preferably carried out in the absence of a solvent under anhydrous conditions, and preferably in an inert atmosphere such as nitrogen. The reaction with the phosphating or sulphating agent is preferably carried out at a temperature from 50° C. to 150° C. and especially at a temperature above 80° C. In order to avoid charring the final dispersant the temperature is preferably not greater than When the dispersant of formula 9 is in the form of a phosphate ester, the ratio of TPOAC alcohol of formula 3 to each phosphorus atom of the phosphating agent is typically from 1:3 to 3:1 and the dispersant may be a mixture of ortho- and pyro-phosphate esters. In the specific case of dispersants of formula 9, it is also preferred that the ratio of TPOAC alcohol to each phosphorus atom of the phosphating agent is from 1:1 to 3:1, and especially from 1:1 to 2:1, when the dispersant is a mixture of mono- and di-esters of ortho phosphoric acid.

The preferred sulphating agent is chlorosulphonic acid, oleum and especially concentrated sulphuric acid. The preferred phosphating agent is $POCl_3$, $P_2O_5$ and especially polyphosphoric acid.

The dispersants of the second aspect of the invention may be in the form of a free acid or the salt of a metal, organic amine or quaternary ammonium salt. The metal is preferably an alkali metal such as lithium, potassium and sodium including mixtures thereof. Suitable organic amines include alkylamines and especially alkanolamines such as mono- and di-ethanolamine.

Whereas, it is preferred to make the dispersants of the first aspect of the invention from a TPOAC acid of formula 2, it is also possible to start with a TPOAC alcohol of formula 3 and convert it to a carboxylic acid ended polymer by reaction with a dibasic acid or anhydride which may be subsequently reacted with an amine, polyamine or polyimine. Such dispersants are those of formula 1 wherein X is the residue of a dibasic acid or anhydride. In likewise manner, it is also possible to prepare sulphate or phosphate ester dispersants by starting with a TPOAC acid of formula 2 by first reacting it with a diol such as ethylene glycol to give a hydroxy terminated polymer which may be subsequently reacted with a sulphating or phosphating agent. Such dispersants correspond to formula 1 wherein X is the residue of a diol.

In the specific case where T is hydrogen in formula 1, the polymer chain represented by $-(A)_m(B)_n-$ will have a terminating hydroxy and carboxylic acid group. The carboxylic acid group may be converted to a terminating hydroxy group by reaction with a diol. This results in a diol containing the polymer chain $-(A)_m(B)_n-$ which when reacted with a sulphating or phosphating agent may carry a sulphate or phosphate ester group at both ends of the chain containing the sequence $-(A)_m(B)_n-$.

Some of the intermediates used to make the present dispersants are novel. Thus, as a further aspect of the invention, there is provided a compound of formulae 2, 3 and 8.

As noted hereinbefore, the dispersants are particularly useful for dispersing a particulate solid in an organic medium and especially a polar organic medium.

According to a further aspect of the invention, there is provided a composition comprising a particulate solid and a dispersant of Formula 1.

According to a still further aspect of the invention, there is provided a dispersion comprising a dispersant of Formula 1, a particulate solid and an organic medium.

The solid present in the dispersion may be any inorganic or organic solid material which is substantially insoluble in the organic medium at the temperature concerned and which it is desired to stabilise in a finely divided form therein.

Examples of suitable solids are pigments for solvent inks; pigments, extenders and fillers for paints and plastics materials; dyes, especially disperse dyes; optical brightening agents and textile auxiliaries for solvent dyebaths, inks and other solvent application systems; solids for oil-based and invert-emulsion drilling muds; dirt and solid particles in dry cleaning fluids; particulate ceramic materials; magnetic materials and magnetic recording media, fire retardants such as those used in plastics materials and biocides, agrochemicals and pharmaceuticals which are applied as dispersions in organic media.

A preferred solid is a pigment from any of the recognised classes of pigments described, for example, in the Third Edition of the Colour Index (1971) and subsequent revisions of, and supplements thereto, under the chapter headed "Pigments". Examples of inorganic pigments are titanium dioxide, zinc oxide, Prussian blue, cadmium sulphide, iron oxides, vermilion, ultramarine and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scarlet and red chromes. Examples of organic pigments are those from the azo, disazo, condensed azo, thioindigo, indanthrone, isoindanthrone, anthanthrone, anthraquinone, sodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthranthrones, quinacridones and carbon blacks.

Other preferred solids are: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g., gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof; agrochemicals such as the fungicides flutriafen, carbendazim, chlorothalonil and mancozeb and fire retardants such as aluminium trihydrate and magnesium hydroxide.

The organic medium present in the dispersions of the invention is preferably a polar organic medium or a substantially non-polar aromatic hydrocarbon or halogenated hydrocarbon. By the term "polar" in relation to the organic medium is meant an organic liquid or resin capable of forming moderate to strong bonds as described in the article entitled "A Three Dimensional Approach to Solubility" by Crowley et al., in Journal of Paint Technology, Vol. 38, 1966, at page 269. Such organic media generally have a hydrogen bonding number of 5 or more as defined in the abovementioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40, and these liquids all fall within the scope of the term polar organic liquid as used herein.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids, there may be mentioned dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran.

The substantially non-polar, organic liquids which may be used, either alone or in admixture with the aforementioned polar solvents, are aromatic hydrocarbons, such as toluene and xylene, aliphatic hydrocarbons such as hexane, heptane, octane, decane, petrolium distillates such as white spirit, mineral oils, vegetable oils and halogenated aliphatic and aromatic hydrocarbons, such as trichloro-ethylene, perchloroethylene and chlorobenzene.

Examples of suitable polar resins, as the medium for the dispersion form of the present invention, are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose. Examples of paint resins include short oil alkyd/melamine-formaldehyde, polyester/melamine-formaldehyde, thermo-setting acrylic/melamine-formaldehyde, long oil alkyd and multi-media resins such as acrylic and urea/aldehyde.

The resin may also be an unsaturated polyester resin including the so-called sheet moulding compounds and bulk moulding compounds which may be formulated with reinforcing fibres and fillers. Such moulding compounds are described in DE 3,643,007 and the monograph by P F Bruins entitled "Unsaturated Polyester Technology", Gordon and Breach Science publishers, 1976, pages 211 to 238.

If desired, the dispersions may contain other ingredients, for example resins (where these do not already constitute the organic medium) binders, fluidising agents (such as those described in GB-A-1508576 and GB-A-2108143), anti-sedimentation agents, plasticisers, levelling agents and preservatives.

The dispersions typically contain from 5 to 95% by weight of the solid, the precise quantity depending on the nature of the solid and the quantity depending on the nature of the solid and the relative densities of the solid and the organic medium. For example, a dispersion in which the solid is an organic material, such as an organic pigment, preferably contains from 15 to 60% by weight of the solid whereas a dispersion in which the solid is an inorganic material, such as an inorganic pigment, filler or extender, preferably contains from 40 to 90% by weight of the solid based on the total weight of dispersion.

The dispersion may be obtained by any of the conventional methods known for preparing dispersions. Thus, the solid, the organic medium and the dispersant may be mixed in any order, the mixture then being subjected to a mechanical treatment to reduce the particles of the solid to an appropriate size, for example by ball milling, bead milling, gravel milling or plastic milling until the dispersion is formed. Alternatively, the solid may be treated to reduce its particle size independently or in admixture with either of the organic medium or the dispersant, the other ingredient or ingredients then being added and the mixture being agitated to provide the dispersion.

If the composition is required in dry form, the liquid medium is preferably volatile so that it may be readily removed from the particulate solid by a simple separation means such as evaporation. It is preferred, however, that the dispersion comprises the liquid medium.

If the dry composition consists essentially of the dispersant and the particulate solid, it preferably contains at least 0.2%, more preferably at least 0.5% and especially at least 1.0% dispersant based on weight of the particulate solid. Preferably, the dry composition contains not greater than 100%, preferably not greater than 50%, more preferably not greater than 20%, and especially not greater than 10% by weight based on the weight of the particulate solid.

As described hereinbefore, the dispersants of the invention are particularly suitable for preparing mill-bases where the particulate solid is milled in a liquid medium in the presence of both a particulate solid and a film-forming resin binder.

Thus, according to a still further aspect of the invention there is provided a mill-base comprising a particulate solid, dispersant and a film-forming resin.

Typically, the mill-base contains from 20 to 70% by weight particulate solid based on the total weight of the mill-base. Preferably, the particulate solid is not less than 30 and especially not less than 50% by weight of the mill-base.

The amount of resin in the mill-base can vary over wide limits but is preferably not less than 10%, and especially not less than 20% by weight of the continuous/liquid phase of the mill-base. Preferably, the amount of resin is not greater than 50% and especially not greater than 40% by weight of the continuous/liquid phase of the mill-base.

The amount of dispersant in the mill-base is dependent on the amount of particulate solid but is preferably from 0.5 to 5% by weight of the mill-base.

Dispersions and mill bases containing the dispersants of the invention are particularly suitable for use in paints, especially high solids paints, inks, especially flexographic, gravure and screen inks, and non-aqueous ceramic processes, especially tape-coating, doctor-blade, extrusion and injection moulding type processes.

The dispersants of the present invention exhibit advantage over similar dispersants containing a polyester chain in place of the polyester/polyamide chain. These advantages include improved fluidity of dispersions containing a particulate solid, dispersant and polar organic medium, particularly where the particulate solid is an organic pigment.

The invention is further illustrated by the following examples wherein all references to amounts are in parts by weight unless indicated to the contrary.

EXAMPLES

Basic Dispersants

Example 1

LA1, Cap 6, ACA 6, PEI (13:1)

6-Amino caproic acid (26.24 parts, 0.2M ex Aldrich) and ε-caprolactone (22.83 parts, 0.2M ex Aldrich) were heated to 190° C. and stirred under nitrogen for 15 mins. The resultant polyester/polyamide had an acid value of 216.03 mg KOH/g. Lauric acid (6.67 parts, 0.033M ex Aldrich) was added at 109° C. followed by zirconium butylate (0.2 parts). The reaction was continued by stirring at 200° C. for 4 hours to give a TPOAC acid with acid value of 36.52 mg KOH/g. The temperature was then lowered to 120° C. and polyethyleneimine (3.2 parts, SP 200, MW 10,000 ex Nippon Shokubai) was added and the reactants were stirred under nitrogen for 6 hours at 120° C. The product was obtained as a pale yellow liquid which after cooling to 20° C. gave a pale yellow wax (44 parts). This is Dispersant 1.

Examples 2 to 6

Example 1 was repeated except using starting materials indicated in Table 1 below in place of the amino caproic acid, lauric acid and ε-caprolactone used in Example 1. The molar ratios of the components are as indicated in Table 1. All the dispersants in Table 1 used polyethylene imine SP 200 (PEI) where the weight ratio of TPOAC acid to PEI was 13:1.

TABLE 1

| Example | Dispersant | TPOAC acid | Acid Value of TPOAC acid (mg KOH/g) |
|---|---|---|---|
| 2 | 2 | LA 1, cap 7.2, 4-ABA 7.2 | 27.82 |
| 3 | 3 | LA 1, cap 7.2, 4-ABA 7.2 | 34.19 |
| 4 | 4 | LA1, cap 4, 11-AUDA 4 | 40.0 |

TABLE 1-continued

| Example | Dispersant | TPOAC acid | Acid Value of TPOAC acid (mg KOH/g) |
|---|---|---|---|
| 5 | 5 | LA 1, cap 8, AL 8 | 30.57 |
| 6 | 6 | LA 1, cap 8, SA 8 | 36.96 |

Footnote to Table 1
LA is lauric acid ex Aldrich
cap is ε-caprolactone ex Aldrich
4-ABA is 4-aminobutyric acid ex Aldrich
11-AUDA is 11-amino undecanoic acid ex Aldrich
AL is β-alanine ex Aldrich
SA is sarcosine ex Aldrich Examples 7 to 10

Application

The dispersant (0.45 parts) was dissolved in solvent (7.55 parts) with stirring and heating as necessary. After cooling to 20° C., pigment (2 parts Monolite Rubine 3B ex Heubach) and 3 mm diameter glass beads (16 parts) were added and the dispersion was milled on a horizontal shaker for 16 hours. The fluidity was assessed by hand-shaking using an arbitrary scale of A (good) to E (poor).

The results are given in Table 2 below.

TABLE 2

| | | Fluidity | | | |
|---|---|---|---|---|---|
| Example | Dispersant | Solvent A | Solvent B | Solvent C | Solvent D |
| 7 | 1 | D | D/E | A | A |
| 8 | 2 | A/B | D | A/B | A/B |
| 9 | 3 | A/B | C | A/B | A/B |
| 10 | 6 | A/B | C/D | A | A |
| | Control 1 | B | A | D/E | E |
| | Control 2 | E | E | E | E |

Footnote to Table 2
Solvent A is methoxy propylacetate/n-butanol (4:1)
Solvent B is toluene
Solvent C is methoxy propylacetate/n-butanol (1:4)
Solvent D is ethanol
Control 1 is ε-caprolactone polymerised with lauric acid and reacted with PEI (MW 10,000).

Control 2 is no agent added and the formulation is made up with extra solvent.

Example 11

6-Amino caproic acid (201 parts, 1.53M ex Aldrich) and ε-caprolactone (175 parts, 1.53M ex Aldrich) were heated to 190° C. and stirred under nitrogen for 30 mins. The resultant polyester/polyamide had an acid value of 179 mg KOH/g. Lauric acid (51.24 parts, 0.25M ex Aldrich) was added at 109° C. followed by zirconium butylate (1 part). The reaction was continued by stirring at 185° C. for 6 hours to give a TPOAC acid with acid value of 39.15 mg KOH/g. The temperature was then lowered to 120° C. and polyethyleneimine (101 parts, SP 200, MW 10,000 ex Nippon Shokubai) was added and the reactants were stirred under nitrogen for 6 hours at 120° C. The product was obtained as a pale yellow liquid which after cooling to 20° C. gave a brown gum (500 parts). This is Dispersant 7.

Examples 12 to 15

Example 1 was repeated except using starting materials indicated in Table 3 below in place of the amino caproic acid, lauric acid, ε-caprolactone and polyethylene imine SP 200 (PEI) used in Example 1. The molar ratios of the components and the weight ratio of polyester polyamide (TPOAC Acid) to PEI are as indicated in Table 3 below.

TABLE 3

| Example | Dispersant | TPOAC acid | Weight Ratio of TPOAC acid:PEI |
|---|---|---|---|
| 12 | 8 | MAA 1, cap 7, 6-ACA 7 | 9:1 SP030 |
| 13 | 9 | HA 1, cap 5, 6-ACA 5 | 12:1 PAA15 |
| 14 | 10 | HDA 1, cap 5, 4-ABA 5 | 15:1 SP075 |
| 15 | 11 | HDA 1, cap 5, 4-ABA 5 | 11:1 SP200 |

Footnote to Table 3
MAA is methoxyacetic acid ex Aldrich
cap is ε-caprolactone ex Aldrich
6-ACA is 6-aminocaproic acid ex Aldrich
4-ABA is 4-aminobutyric acid ex Aldrich
HDA is Isocarb 16 (2-hexyldecanoic acid) ex Sasol
SP030 and SP075 are polyethylenimine with Mn 3000 and 7500 respectively, ex Nippon Shokubai
PAA15 is polyallylamine with MW 15000, ex Nitto Boseki Co Ltd.

Example 16

Dispersant 10 (32 parts) was stirred with succinic anhydride (0.8 parts) at 80° C. under a nitrogen atmosphere for 3 hrs to give a golden liquid (31 parts). This is Dispersant 12.

Example 17

The TPOAC acid of Dispersant 10 (HDA1, cap 5,4-ABA 5) (40 parts) and a polyester chain comprising ricinoleic acid and caprolactone (10 parts) prepared by the method outlined in Polyester 11 of U.S. Pat. No. 6,787,600 were stirred together at 90° C. for 10 mins under a nitrogen atmosphere and then polyethyleneimine SP050 (Mn 5000, ex Nippon Shokubai) (3.85 parts) was added. The whole mixture was stirred at 120° C. for 6 hours to give a golden viscous liquid. This is Dispersant 13.

Example 18

6-Amino caproic acid (52.24 parts, 0.398M ex Aldrich) and ε-caprolactone (45.45 parts, 0.398M ex Aldrich) were heated to 190° C. and stirred under nitrogen for 30 mins. The resultant polyester/polyamide had an acid value of 179 mg KOH/g. Lauric acid (13.29 parts, 0.066M ex Aldrich) was added at 109° C. followed by zirconium butylate (1 part). The reaction was continued by stirring at 185° C. for 6 hours to give a TPOAC acid with acid value of 36.9 mg KOH/g. The temperature was then lowered to 115° C. and 3-dimethylaminopropylamine (3.35 parts 0.033M) was added and the reactants were stirred under nitrogen for 8 hours at 185° C. The product was obtained as a beige wax on cooling with acid value 20.3 mg KOH/g. This is Dispersant 14.

Example 19

Dispersant 14 (50 parts) and dimethyl sulphate (1.63 parts 0.013M ex Aldrich) were stirred at 90° C. for 6 hours under a nitrogen atmosphere to give a beige wax on cooling (50 parts). This is Dispersant 15.

Example 20

Polyethyleneglycol monomethyl ether (105 parts 0.3M ex Aldrich), 4-aminobutyric acid (55.68 parts 0.54M ex Aldrich)

and ε-caprolactone (61.63 parts 0.54M ex Aldrich) were stirred at 190° C. for 20 mins under a nitrogen atmosphere to give a golden liquid with an acid value of 69.1 mg KOH/g and base equivalent 16135. The temperature was lowered to 150° C. and zirconium butylate (0.5 part) was added. The temperature of the mixture was raised to 190° C. and stirred for 6 hours. A pale brown liquid was obtained (210 parts) with an acid value of 1.1 mg KOH/g. This is Intermediate 1.

Polyphosphoric acid (3.85 parts) was added to intermediate 1 (50 parts) and the whole mixture was stirred at 90° C. for 6 hours under a nitrogen atmosphere to give a brown liquid (53 parts). This is Dispersant 16.

Polyphosphoric acid (6.46 parts) was added to intermediate 1 (42 parts) and the whole mixture was stirred at 90° C. for 6 hours under a nitrogen atmosphere to give a brown liquid (53 parts). This is Dispersant 17.

Examples 21-29

Application

The dispersant (0.45 parts) was dissolved in solvent (7.55 parts) with stirring and heating as necessary. After cooling to 20° C., pigment (2 parts Monolite Rubine 3B ex Heubach) and 3 mm diameter glass beads (16 parts) were added and the dispersion was milled on a horizontal shaker for 16 hours. The fluidity was assessed by hand-shaking using an arbitrary scale of A (good) to E (poor).

The results are given in Table 4 below.

TABLE 4

| | | Fluidity |
|---|---|---|
| Example | Dispersant | Ethanol 74OP |
| 21 | 2 | A/B |
| 22 | 3 | A/B |
| 23 | 6 | A/B |
| 24 | 8 | B |
| 25 | 9 | A/B |
| 26 | 10 | C/D |
| 27 | 11 | C/D |
| 28 | 12 | C/D |
| 29 | 13 | D |
| | Control 1 | E |
| | Control 2 | E |

Examples 30-31

Application

The dispersant (0.25 parts) was dissolved in ethanol 74OP (6.75 parts) with stirring as necessary. A red iron oxide pigment (3 parts Sicotrans Red L2817 ex BASF) and 3 mm diameter glass beads (16 parts) were added and the dispersion was milled on a horizontal shaker for 16 hours. The fluidity was assessed by hand-shaking using an arbitrary scale of A (good) to E (poor).

The results are given in Table 5 below.

The dispersant (0.2 parts) was dissolved in ethanol 74OP (2.3 parts) with stirring as necessary. A titanium dioxide pigment (7.5 parts Tioxide TR92 ex Huntsman) and 3 mm diameter glass beads (16 parts) were added and the dispersion was milled on a horizontal shaker for 16 hours. The fluidity was assessed by hand-shaking using an arbitrary scale of A (good) to E (poor).

The results are given in Table 5 below.

TABLE 5

| | | Fluidity | |
|---|---|---|---|
| Example | Dispersant | Sicotrans Red L2817 | Tioxide TR92 |
| 30 | 16 | B/C | B/C |
| 31 | 17 | B/C | C |
| | Control 2 | E | E |
| | Control 3 | E | E |

Footnote to Table 5
Control 2 is no agent added and the formulation is made up with extra solvent.
Control 3 is ε-caprolactone polymerised with dodecanol and reacted with phosphorus pentoxide.

The invention claimed is:

1. A dispersant of formula 1:

$$T\text{-}(A)_m(B)_n\text{---}X\text{---}Z\text{-}Q_{(0-p)} \qquad \text{Formula (1)}$$

including salts thereof
wherein
-(A)$_m$(B)$_n$— is the reaction product of at least one hydroxy carboxylic acid or lactone thereof and at least one amino carboxylic acid at 50 C to 250 C optionally in the presence of a esterification catalyst where m and n are as described below;
T is hydrogen or a polymerisation terminating group;
A is an oxyalkylene carbonyl residue of a hydroxy carboxylic acid or lactone thereof;
B is derived from said amino carboxylic acid;
X is a direct bond or a divalent linking group;
Z is a basic group of 1000 to 200,000 g/mole number average molecular weight selected from polyvinylamine or poly(C$_{2-4}$-alkyleneimine) or a moiety which contains said basic group;
when Z is said polyvinylamine or poly(C$_{2-4}$-alkyleneimine), Q is an oxygen atom of a N-oxide reaction product of amino or imino groups of Z reacted with oxygen or a peroxide, or a reaction product of said amino or imino groups reacted with dibasic acid or anhydride thereof;
m and n are non-zero positive integers
m+n is from 4 to 2000;
(0-p) means from the value 0 to the value p;
p represents the maximum available number of amino and/or imino groups in Z which does not carry the group T-(A)$_m$(B)$_n$X—;
when Z is a basic group selected from polyvinylamine or poly(C$_{2-4}$-alkyleneimine) or a moiety which contains said basic group there may be more than one group T-(A)$_m$(B)$_n$—X— attached to Z and said more than one group may be chemically the same or different.

2. A dispersant as claimed in claim 1 wherein T is a terminating group derived from a carboxylic acid R—COOH or alcohol R—OH wherein R is optionally substituted C$_{1-50}$-hydrocarbyl and wherein Z is a basic group selected from poly(C$_{2-4}$-alkyleneimine).

3. A dispersant as claimed in claim 2 wherein R is optionally substituted alkyl which may be linear or branched.

4. A dispersant as claimed in claim 2 wherein R contains one or more ether groups.

5. A dispersant as claimed in claim 1 wherein A is derived from a hydroxy-C$_{2-20}$-alkenylene carboxylic acid or a hydroxy-C$_{1-20}$-alkylene carboxylic acid or lactone thereof.

6. A dispersant as claimed in claim 5 wherein the lactone is ε-caprolactone.

7. A dispersant as claimed in claim 1 wherein B is derived from an amino-$C_{2-20}$-alkenylene carboxylic acid or an amino-$C_{1-20}$-alkylene carboxylic acid.

8. A dispersant as claimed in claim 7 wherein the amino-$C_{1-20}$-alkylene carboxylic acid is 6-amino caproic acid, 4-aminobutyric acid, β-alanine or sarcosine.

9. A dispersant as claimed in claim 1 wherein m+n is not greater than 20.

10. A dispersant as claimed in claim 1 wherein the ratio of m:n is from 3:1 to 1:3.

11. A dispersant as claimed in claim 1 which comprises a poly($C_{2-4}$-alkyleneimine) carrying at least two chains of formula 4:

$$T\text{-}(A)_m(B)_n\text{---} \qquad \text{Formula (4)}$$

wherein T, A, B, m and n are as defined in claim 1.

12. A dispersant as claimed in claim 1 wherein the dispersant is represented by formula 5:

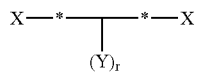

Formula (5)

wherein
X-*-*-X represents polyvinylamine or poly($C_{2-4}$-alkyleneimine);
Y represents the chain T-$(A)_m$-$(B)_n$— which is linked via an amide and/or salt linkage;
T, A, B, m and n are as defined in claim 1; and
r is from 4 to 2000.

13. A dispersant as claimed in claim 12 wherein the weight ratio of X-*-*-X to Y is from 20:1 to 5:1 and wherein X-*-*-X represents poly($C_{2-4}$-alkyleneimine).

14. A dispersant as claimed in claim 12 wherein Y represents a chain residue of formula 7:

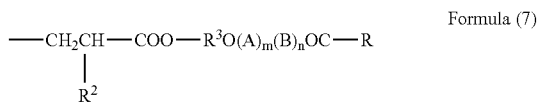

Formula (7)

wherein
R is a $C_{1-20}$ hydrocarbyl group;
$R^2$ is hydrogen or $C_{1-4}$-alkyl; and
$R^3$ is an aliphatic or aromatic residue containing up to 10 carbon atoms which optionally contains a polyether residue derivable from propylene oxide and/or ethylene oxide.

15. A dispersant as claimed in claim 1 derived from reacting a TPOAC acid of formula 2:

$$R\text{---}CO(A)_m(B)_n\text{---}OH \qquad \text{Formula (2)}$$

with poly($C_{2-4}$-alkyleneimine) at a temperature from 50 to 250° C. preferably in an inert atmosphere and wherein R is a $C_{1-50}$-hydrocarbyl.

16. A dispersant as claimed in claim 14 derived from reacting a compound of formula 8:

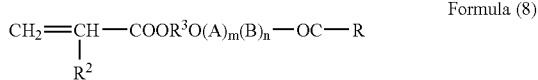

Formula (8)

with polyvinylamine or poly($C_{2-4}$-alkyleneimine).

17. A composition comprising a particulate solid and a dispersing agent as claimed in claim 1.

18. A composition as claimed in claim 17 which further comprises an organic liquid.

19. A composition according to claim 18, further comprising a film-forming binder resin and used as a millbase, paint, or ink.

20. A composition as claimed in claim 19 wherein the organic liquid is a polar organic liquid.

* * * * *